US012267853B2

(12) United States Patent
He et al.

(10) Patent No.: US 12,267,853 B2
(45) **Date of Patent: *Apr. 1, 2025**

(54) METHODS AND APPARATUS FOR DL CONTROL CHANNEL MONITORING AND CANDIDATES DROPPING IN WIRELESS COMMUNICATION

(71) Applicant: APPLE INC., Cupertino, CA (US)

(72) Inventors: Hong He, San Jose, CA (US); Chunhai Yao, Beijing (CN); Dawei Zhang, Saratoga, CA (US); Haitong Sun, Cupertino, CA (US); Jie Cui, San Jose, CA (US); Oghenekome Oteri, San Diego, CA (US); Wei Zeng, Saratoga, CA (US); Weidong Yang, San Diego, CA (US); Yang Tang, San Jose, CA (US)

(73) Assignee: APPLE INC., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/613,642

(22) Filed: Mar. 22, 2024

(65) Prior Publication Data

US 2024/0244630 A1 Jul. 18, 2024

Related U.S. Application Data

(63) Continuation of application No. 17/593,120, filed as application No. PCT/CN2020/083720 on Apr. 8, 2020, now Pat. No. 11,991,716.

(51) Int. Cl.
*H04W 72/23* (2023.01)
*H04L 5/00* (2006.01)

(52) U.S. Cl.
CPC ............ *H04W 72/23* (2023.01); *H04L 5/001* (2013.01)

(58) Field of Classification Search
CPC .............................. H04W 72/23; H04L 5/001
See application file for complete search history.

(56) References Cited

U.S. PATENT DOCUMENTS 11,991,716 B2 * 5/2024 He ........................ H04L 5/0053
2011/0103509 A1 5/2011 Chen et al.
(Continued)

FOREIGN PATENT DOCUMENTS

CN 102763473 A 10/2012
CN 107819550 A 3/2018
(Continued)

OTHER PUBLICATIONS

U.S. Appl. No. 17/593,120, Notice of Allowance, Dec. 6, 2023, 13 pages.
(Continued)

*Primary Examiner* — Brenda H Pham
(74) *Attorney, Agent, or Firm* — Dorsey & Whitney LLP

(57) ABSTRACT

Methods, systems, and devices for wireless communications are described. To monitor a PDCCH for CA, a UE may receive PDCCH candidates in a plurality of configured component carriers (CCs). In response to a determination that a maximum number of virtual CCs that the UE is capable of monitoring for PDCCH is smaller than a number of the plurality of configured CCs, the UE groups the plurality of configured CCs into CC groups based at least in part on SCS numerologies and PDCCH monitoring configurations corresponding to span patterns within a slot of a DL subframe. The UE determines a maximum number of blind decoding operations and non-overlapped CCEs for each of the CC groups. The UE then monitors at least a first portion of the PDCCH candidates based on the maximum number of blind decoding operations and non-overlapped CCEs for each of the CC groups.

20 Claims, 10 Drawing Sheets

(56) References Cited

U.S. PATENT DOCUMENTS

2012/0039180 A1 2/2012 Kim et al.
2012/0044821 A1 2/2012 Kim et al.
2013/0058240 A1 3/2013 Kim et al.
2013/0155868 A1* 6/2013 Seo .................. H03M 13/3723 370/241

FOREIGN PATENT DOCUMENTS

WO 2019122518 A1 6/2019
WO 2019157766 A1 8/2019
WO 2021203276 A1 10/2021

OTHER PUBLICATIONS

Huawei, Hisilicon, "Corrections on PDCCH enhancement for URLLC", R1-2001023, 3GPP TSG RAN WG1 Meeting #100-e, Agenda Item 7.2.5.1, Feb. 24-Mar. 6, 2020, 15 pages.
Intel Corporation, "Remaining aspects on Rel-16 PDCCH enhancements for URLLC", R1-2000735, 3GPP TSG RAN WG1 #100-E, e-Meeting, Agenda Item 7.2.5.1, Feb. 24-Mar. 6, 2020, 20 pages.
Nokia, Nokia Shanghai Bell, "Maintenance of Rel-16 URLLC PDCCH enhancements", R1-2000432, 3GPP TSG RAN WG1 Meeting #100, e-Meeting, Agenda Item 7.2.5.1, Feb. 24-Mar. 6, 2020, 28 pages.
PCT/CN2020/083720, International Search Report and Written Opinion, Dec. 30, 2020, 9 pages.

* cited by examiner

METHODS AND APPARATUS FOR DL CONTROL CHANNEL MONITORING AND CANDIDATES DROPPING IN WIRELESS COMMUNICATION

TECHNICAL FIELD

This application relates generally to wireless communication systems, and more specifically to techniques for physical downlink control channel generation and blind decoding for new radio (NR) systems or network devices of an NR network.

BACKGROUND

Wireless mobile communication technology uses various standards and protocols to transmit data between a base station and a wireless mobile device. Wireless communication system standards and protocols can include the 3rd Generation Partnership Project (3GPP) long term evolution (LTE) (e.g., 4G) or new radio (NR) (e.g., 5G); the Institute of Electrical and Electronics Engineers (IEEE) 802.16 standard, which is commonly known to industry groups as worldwide interoperability for microwave access (WiMAX); and the IEEE 802.11 standard for wireless local area networks (WLAN), which is commonly known to industry groups as Wi-Fi. In 3GPP radio access networks (RANs) in LTE systems, the base station can include a RAN Node such as a Evolved Universal Terrestrial Radio Access Network (E-UTRAN) Node B (also commonly denoted as evolved Node B, enhanced Node B, eNodeB, or eNB) and/or Radio Network Controller (RNC) in an E-UTRAN, which communicate with a wireless communication device, known as user equipment (UE). In fifth generation (5G) wireless RANs, RAN Nodes can include a 5G Node, NR node (also referred to as a next generation Node B or g Node B (gNB)).

RANs use a radio access technology (RAT) to communicate between the RAN Node and UE. RANs can include global system for mobile communications (GSM), enhanced data rates for GSM evolution (EDGE) RAN (GERAN), Universal Terrestrial Radio Access Network (UTRAN), and/or E-UTRAN, which provide access to communication services through a core network. Each of the RANs operates according to a specific 3GPP RAT. For example, the GERAN implements GSM and/or EDGE RAT, the UTRAN implements universal mobile telecommunication system (UMTS) RAT or other 3GPP RAT, and the E-UTRAN implements LTE RAT, and NG-RAN implements 5G RAT. In certain deployments, the E-UTRAN may also implement 5G RAT.

Frequency bands for 5G NR may be separated into two different frequency ranges. Frequency Range 1 (FR1) includes sub-6 GHz frequency bands, some of which are bands that may be used by previous standards, but may potentially be extended to cover potential new spectrum offerings from 410 MHz to 7125 MHz. Frequency Range 2 (FR2) includes frequency bands from 24.25 GHz to 52.6 GHz. Bands in the millimeter wave (mm-Wave) range of FR2 have shorter range but higher available bandwidth than bands in the FR1. Skilled persons will recognize these frequency ranges, which are provided by way of example, may change from time to time or from region to region.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
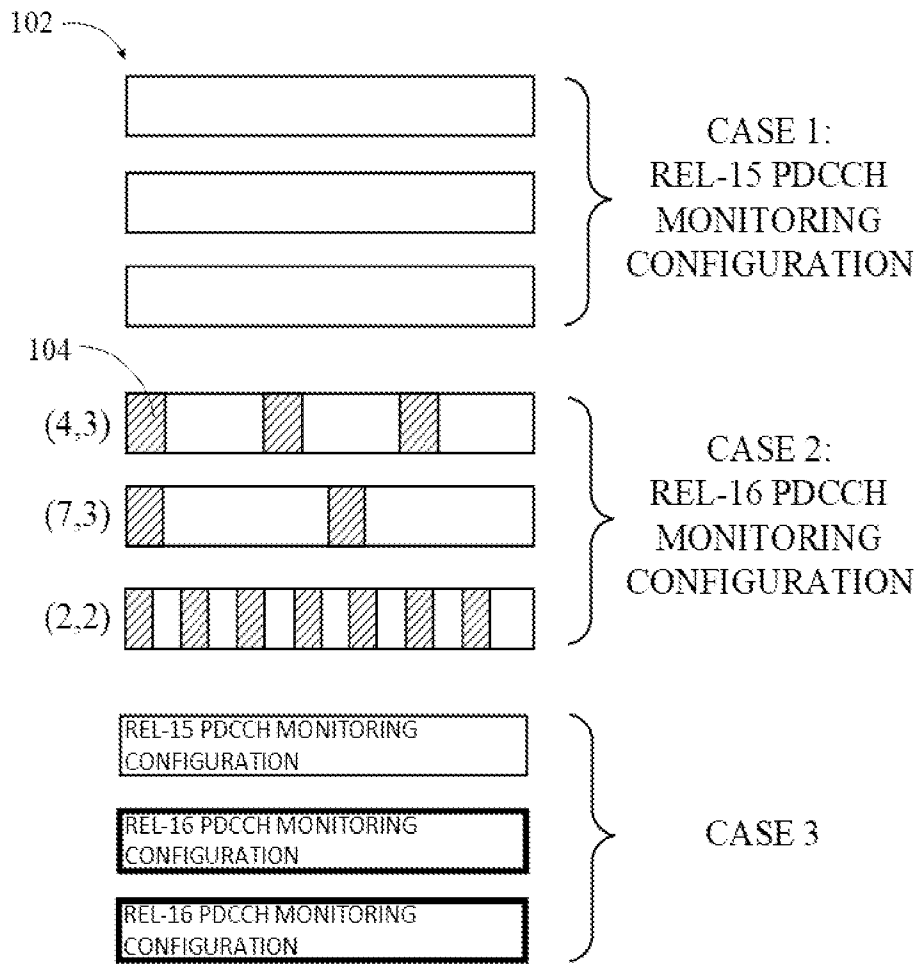
FIG. 1 illustrates a PDCCH monitoring configuration in accordance with one embodiment.

In NR, a UE can monitor a set of physical downlink control channel (PDCCH) candidates in one or more control resource sets (CORESETs) on an active downlink (DL) bandwidth part (BWP) on each activated serving cell according to corresponding search spaces. Monitoring implies or refers to decoding (or attempting to decode) some or all PDCCH candidates in the PDCCH candidate set. A set of PDCCH candidates for a UE to monitor can be defined in terms of PDCCH search spaces. A search space can be a common search space (CSS) or a UE-specific search space (USS).

A UE may be capable of monitoring PDCCH candidates configured by the next generation NodeB (gNB) to improve scheduling flexibility. However, due to the terminal complexity and cost concerns, the maximum number of blind decoding attempts and number of control channel elements (CCEs) for channel estimation in a UE can be limited.

NR implementations (e.g., Rel-15) supports two PDCCH monitoring configurations referred to as slot-based (i.e., Case 1-1/Case 1-2) or non-slot-based (i.e., span-based or Case 2), subject to UE capability. A span pattern is a time configuration within a slot and per slot for PDCCH monitoring on an active DL BWP of a serving cell. The span-based PDCCH monitoring (Case 2) provides more than one PDCCH scheduling opportunities so as to meet the stringent latency requirement for Ultra-Reliable (UR) Low Latency Communications (URLLC) services.

For certain NR implementations (e.g., Rel-16), the PDCCH monitoring capabilities may be enhanced to improve the scheduling flexibility for URLLC services. More specially, the maximum number of blind decoding attempts (or simply, blind decoding (BD)) and non-overlapped CCEs are specified per span, which results in a different number of BDs and non-overlapped CCEs over a slot for different span configurations. CCEs for PDCCH candidates are non-overlapped if they correspond to different CORESET indexes, or different first symbols for the reception of the respective PDCCH candidates.

For carrier aggregation (CA), there may be two scenarios for PDCCH monitoring. In first scenario, a maximum number of "virtual" component carriers (CCs) $N_{cells}^{cap\text{-}r16}$ is not smaller than the number of cells configured by a gNB subject to UE capability $N_{cells}$. In a second scenario, the maximum number of virtual CCs $N_{cells}^{cap-r16}$ is smaller than the number of cells configured by the gNB subject to UE capability $N_{cells}$. For second scenario, however, there are several issues that need to be addressed.

For example, one issue is how to divide a reported PDCCH monitoring capability for the maximum number of virtual CCs $N_{cells}^{cap-r16}$ (i.e., blind decoding and non-overlapped CCEs) across different CC groups with either different subcarrier spacing (SCS) numerologies or same SCS numerologies but different span configurations. Another issue is how to define "overbooking" rules for search space configuration so as to fully utilize the UE PDCCH monitoring capability and improve or maximize the PDCCH scheduling flexibility.

Embodiments disclosed herein divide a UE's PDCCH monitoring capability for the maximum number of virtual CCs $N_{cells}^{cap-r16}$ across different CC groups with different SCS numerologies and/or different span configurations. In addition, or in other embodiments, overbooking configurations and dropping rules are provided. Thus, when the maximum number of virtual CCs $N_{cells}^{cap-r16}$ is smaller than the number of cells configured by the gNB subject to UE capability $N_{cells}$, the disclosed embodiments improve use of the UE PDCCH monitoring capability and improve or maximize the PDCCH scheduling flexibility.

According to certain aspects of the disclosure herein, a variety of cases may be considered for determination of maximum PDCCH candidates and non-overlapping CCEs. For example, FIG. 1 illustrates a PDCCH monitoring configuration that may be used for certain embodiments. In the illustrated Case 1, a UE is configured to monitor PDCCH candidates for all DL CCs in slots 102 with Rel-15 configuration only. In the illustrated Case 2, the UE is configured to monitor PDCCH candidates for DL CCs with Rel-16 configuration only. For Case 2, it is possible that different span patterns (i.e., (2,2), (4,3), (7,3)) may be configured for different serving cells.

As shown, span patterns may be represented by a set of integers (e.g., (7,3)) where the first integer defines a gap between successive locations 104 (i.e., occasions) in a slot including PDCCH candidates or scheduled data. In particular, the first integer indicates the number of symbols from a first symbol of a first span to a first symbol of a next span. The second integer defines a maximum number of consecutive OFDM symbols of one span to configure, subject to the total number of symbols in the slot and the gap defined by the first integer. For example, if there are 14 symbols in the slot, the second integer in (2,2) is used to determine that 14/2-7 locations in the slot are PDCCH monitoring locations. An index i may also be used to represent span configurations. For example, i=0 indicates span pattern (2,2), i=1 indicates span pattern (4,3), and i=2 indicates span pattern (7,3).

For Case 2, if separation of two consecutive PDCCH monitoring occasions is equal to or larger than a predetermined value (value of X) for at least two span patterns, the UE may be expected to monitor PDCCH candidates according to the span pattern with the largest number of non-overlapped CCs and BDs.

For the illustrated Case 3, the UE is configured to PDCCH candidates for X DL CCs with Rel-15 configuration and Y DL CCs with Rel-16 CCs.

Span-Based PDCCH Overbooking Operation

Figure 2:
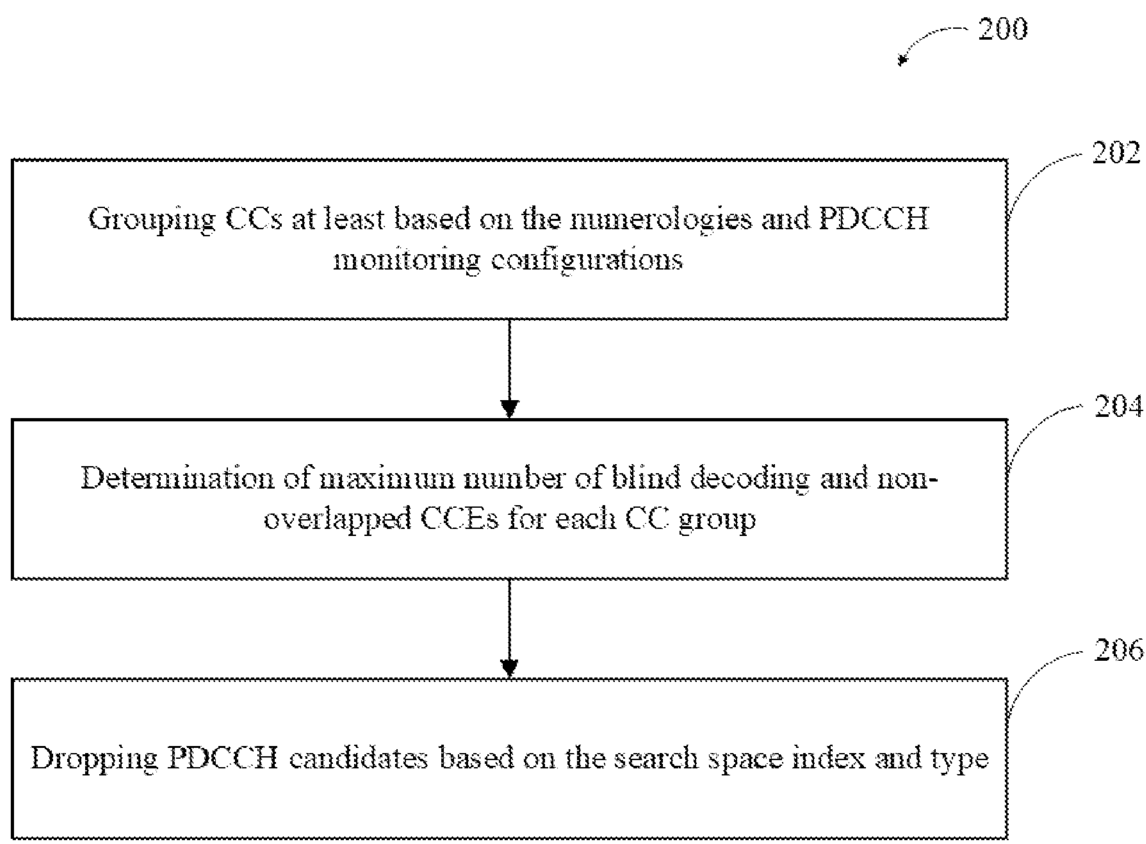
FIG. 2 is a flow chart illustrating a method for configuring or monitoring PDCCH in accordance with one embodiment.

Certain embodiments enable span-based PDCCH overbooking operations. For example, FIG. 2 is a flow chart illustrating a method 200 for configuring or monitoring PDCCH for CA according to one embodiment. The method 200 includes grouping 202 CCs at least based on the numerologies and PDCCH monitoring configuration in terms of span. According to certain embodiments, as discussed in detail below, the CCs with a same subcarrier spacing (SCS) numerology and span configuration (e.g., (2,2)) are grouped together. The method 200 further includes a determination 204 of a maximum number of blind decoding operations and non-overlapped CCEs for each CC group. Further, in case of overbooking of PDCCH blind decoding operations and/or non-overlapped CCEs, the method 200 includes dropping 206 PDCCH candidates based on search space set (SSS) type and search space index q, as described below.

Span Configuration: Dependent CCs Grouping

According to certain embodiments (e.g., for Case 2 or Case 3 shown in FIG. 1), the configured CCs may be divided into a set of groups at least based on SCS numerology u and PDCCH monitoring configurations (i.e., Rel-15 vs. Rel-16 PDCCH monitoring configuration, and/or span configurations i=0 (2,2) vs. i=1 (4,3) vs. i=2 (7,3)). In certain embodiments, the grouping operation may only be conducted when a maximum number of virtual CCs $N_{cells}^{cap-r16}$ is smaller than the number of cells configured by gNB subject to UE capability $N_{cells}$.

Figure 3:
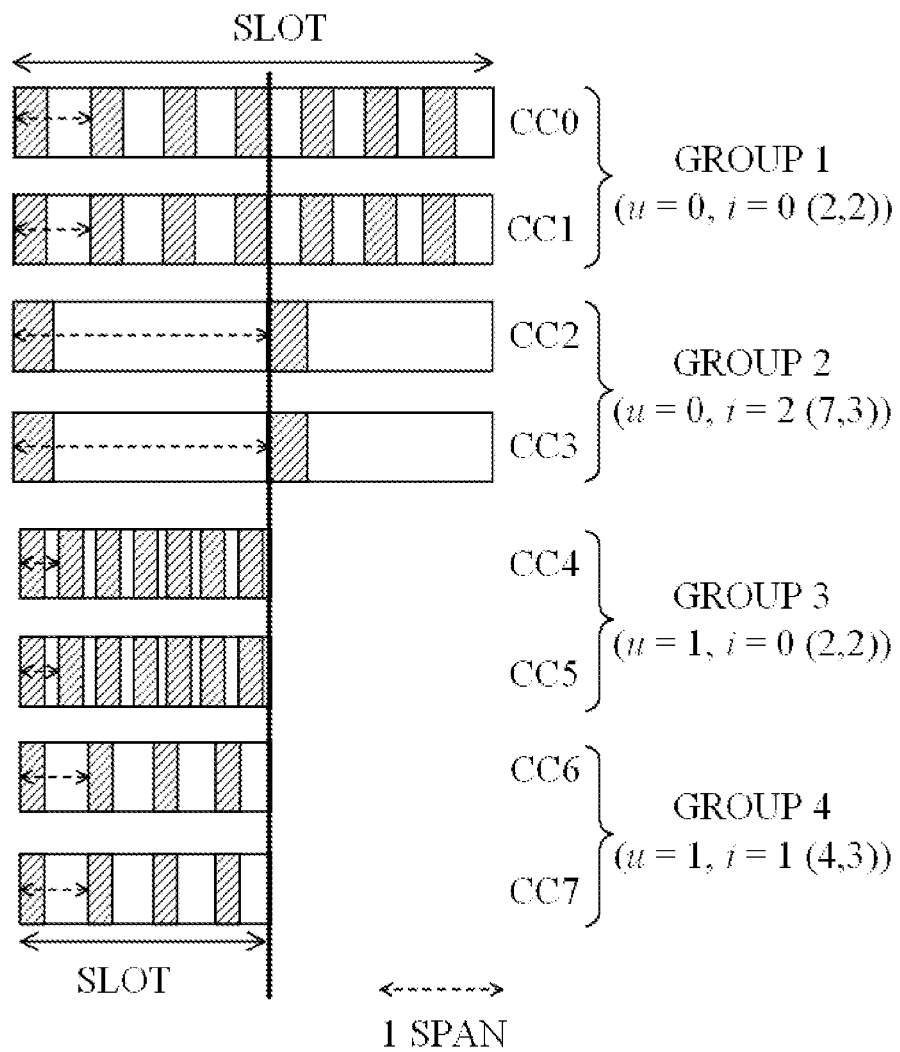
FIG. 3 illustrates an example grouping operation in accordance with one embodiment.

FIG. 3 illustrates an example grouping operation according to one embodiment. As shown, the SCS numerology u=0,1. For example, u=0 may correspond to 15 kHz SCS and u=1 may correspond to 30 kHz SCS. Also in this example, the maximum number of virtual CCs $N_{cells}^{cap-r16}$=8, and the number of cells configured by gNB subject to UE capability $N_{cells}$=4. Thus, the maximum number of virtual CCs $N_{cells}^{cap-r16}$ is smaller than the number of cells configured by the gNB subject to UE capability $N_{cells}$. As shown in FIG. 3, eight CCs (CC0, CC1, CC1, CC3, CC4, CC5, CC6, and CC7) are grouped as follows, where $ND_{cells}^{DL,u,i}$: represents the number or CCs in each group based on SCS numerology u and span configuration i:

$$\text{for } u=0\text{: } N_{cells}^{DL,0,0}=2;\ N_{cells}^{DL,0,2}=2,$$

and $$\text{for } u=1\text{: } N_{cells}^{DL,1,0}=2;\ N_{cells}^{DL,1,1}=2,$$

which results in grouping CC0 and CC1 in Group 1, CC2 and CC3 in Group 2, CC4 and CC5 in Group 4, and CC6 and CC7 in Group 4. Skilled persons will recognize from the disclosure herein that number of CCs, numerologies, and specific configurations associate with FIG. 3 are provided by way of example only, and that other numbers of CCs, numerologies, and configurations may also be used.

Blind Decoding and CCEs Determinations

In one embodiment, a UE is allowed to indicate (e.g., to a gNB) a maximum number of virtual CCs $N_{cells}^{cap-r16}$, which is used to calculate the number of PDCCH candidates and a maximum number of non-overlapped CCEs that the UE can monitor per span pattern when the UE is configured over more than a number (e.g., X number) of DL cells.

In certain embodiments (at least for Case 2 shown in FIG. 1), if the UE is configured with $N_{cells}^{DL,u,i}$ DL cells with DL BWPs having SCS configuration u and span configuration i, where $$\sum_{u=0}^{1}\sum_{i=0}^{2} N_{cells}^{DL,u,i} > N_{Cells}^{cap-r16},$$

the UE is not required to monitor more than $M_{PDCCH}^{total,span,u,i}$ PDCCH candidates or more than $C_{PDCCH}^{total,span,u,i}$ non-overlapped CCEs per span on the active DL BWP(s) of scheduling cells from the $N_{cells}^{DL,u,i}$ DL cells.

Determining the maximum number of BD operations and non-overlapping CCEs may include calculating:

$$M_{PDCCH}^{total,span,u,i}=\left\lfloor N_{cells}^{cap-r16}\cdot M_{PDCCH}^{max,span,u,i}\cdot N_{cells}^{DL,u,i}/\sum_{j=0}^{1}\sum_{k=0}^{2}N_{cells}^{DL,j,k}\right\rfloor;$$

and $$C_{PDCCH}^{total,span,u,i}=\left\lfloor N_{cells}^{cap-r16}\cdot C_{PDCCH}^{max,span,u,i}\cdot N_{cells}^{DL,u,i}/\sum_{j=0}^{1}\sum_{k=0}^{2}N_{cells}^{DL,j,k}\right\rfloor,$$

wherein the UE is configured with $N_{cells}^{DL,u,i}$ DL cells with active DL BWPs comprising SCS configuration u and span configuration i, where $$\sum_{u=0}^{1}\sum_{i=0}^{2}N_{cells}^{DL,u,i}>N_{cells}^{cap-r16},$$

wherein $M_{PDCCH}^{max,span,u,i}$ is a maximum number of blind decoding operations for the SCS configuration u and the span configuration i (e.g., i=0,1,2 for span (2,2), (4,3), (7,3)), and wherein $C_{PDCCH}^{max,span,u,i}$ is a maximum number of non-overlapped CCEs for the SCS configuration u and the span configuration i.

Figure 4:
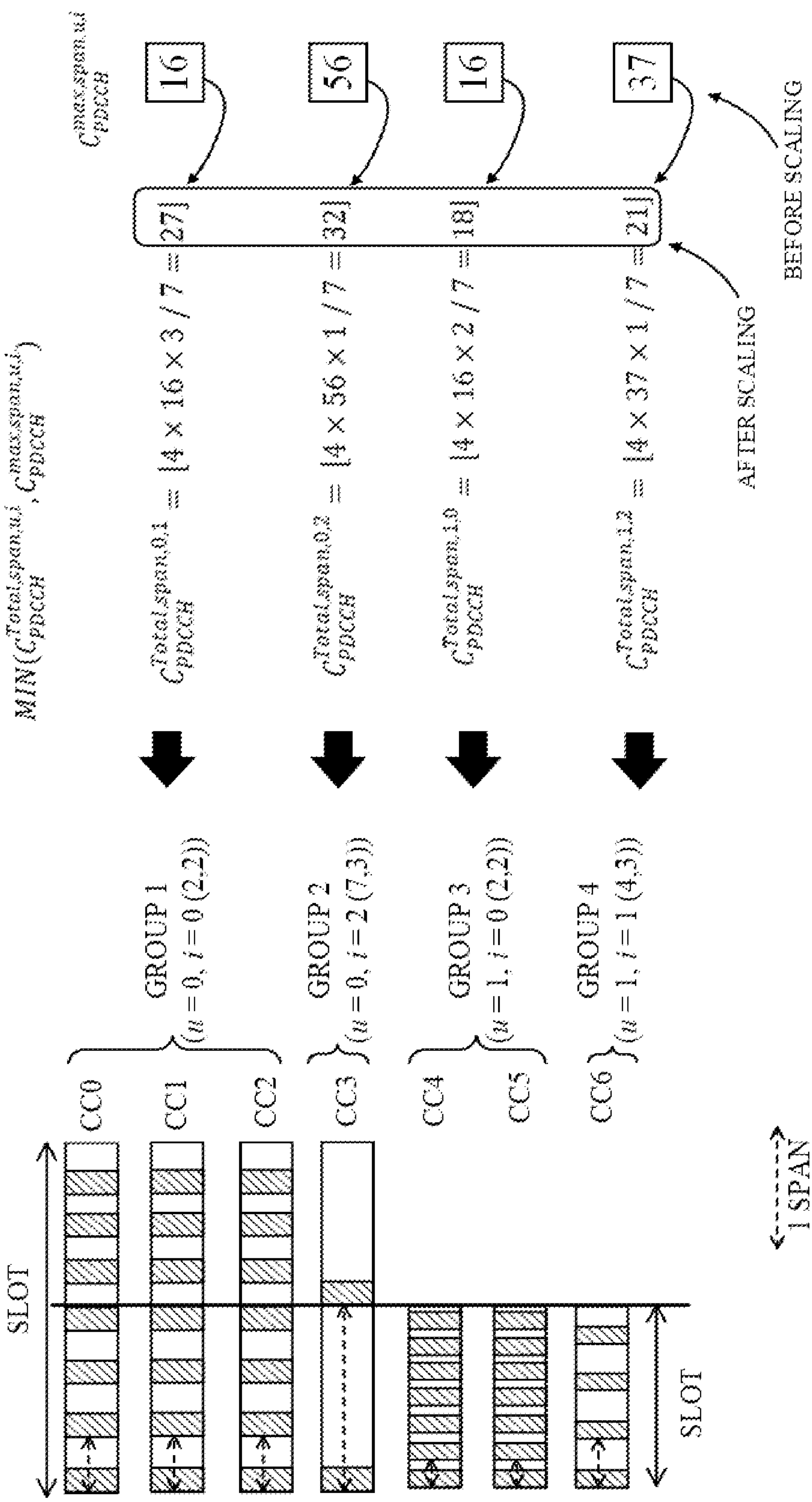
FIG. 4 illustrates an example of reduced non-overlapped CCEs accordance with one embodiment.

FIG. 4 illustrates an example of reduced non-overlapped CCEs according to one embodiment. In particular, a process is shown for calculating values $C_{PDCCH}^{total,span,u,i}$ for corresponding CC groups. Each value of $C_{PDCCH}^{total,span,u,i}$ is a total number of non-overlapped CCEs shared by all CCs within the respective group with SCS u and span configuration i. In this example, the SCS numerology u=0,1, the maximum number of virtual CCs $N_{cells}^{cap-r16}=7$, and the number of cells configured by gNB subject to UE capability $N_{cells}=4$. Thus, the maximum number of virtual CCs $N_{cells}^{cap-r16}$ is smaller than the number of cells configured by gNB subject to UE capability $N_{cells}$. As shown in FIG. 4, seven CCs (CC0, CC1, CC1, CC3, CC4, CC5, and CC6) are grouped as follows, where $N_{cells}^{DL,u,i}$: represents the number or CCs in each group based on SCS numerology u and span configuration i:

$$\text{for } u=0\text{: } N_{cells}^{DL,0,0}=3;\ N_{cells}^{DL,0,2}=1,$$

and $$\text{for } u=1\text{: } N_{cells}^{DL,1,0}=2;\ N_{cells}^{DL,1,1}=1,$$

which results in grouping CC0, CC1, and C2 in Group 1, CC3 in Group 2, CC4 and CC5 in Group 3, and CC6 in Group 4. For each of these groups, FIG. 4 illustrates calculating $C_{PDCCH}^{total,span,u,i}$ using:

$$C_{PDCCH}^{total,span,u,i}=\left\lfloor N_{cells}^{cap-r16}\cdot C_{PDCCH}^{max,span,u,i}\cdot N_{cells}^{DL,u,i}/\sum_{j=0}^{1}\sum_{k=0}^{2}N_{cells}^{DL,j,k}\right\rfloor,$$

where $C_{PDCCH}^{max,span,u,i}$ shown in FIG. 4 is a predetermined value for a single CC. For example, $C_{PDCCH}^{max,span,u,i}=16$ for each of the three CCs in Group 1, which when combined before scaling 16+16+16-48. After scaling using the above equation, however, $C_{PDCCH}^{total,span,u,i}=27$ for Group 1. Thus, the UE is not required to monitor more than the lesser of $C_{PDCCH}^{max,span,u,i}$ or $C_{PDCCH}^{total,span,u,i}$ non-overlapped CCEs per span on the active DL BWPs of scheduling cells from $N_{cells}^{DL,u,i}$ DL cells. Skilled persons will recognize from the disclosure herein that number of CCs, numerologies, and specific configurations associate with FIG. 4 are provided by way of example only, and that other numbers of CCs, numerologies, and configurations may also be used.

Overbooking Configuration and Dropping Rules

In certain embodiments, the number of non-overlapped CCEs for channel estimation or number of BDs across search space sets on a span may be allowed to exceed the maximum number of non-overlapped CCEs and BDs (i.e. "overbooking" operation). There may be various options for an overbooking operation. For example, in a first option (Option 1), the overbooking is only allowed for the span(s) on cell(s) where CSS is configured (e.g., a primary cell (PCell) or primary secondary cell (pSCell)). In a second option (Option 2), the overbooking is allowed for all the span(s) on cell(s) where CSS is configured (e.g., PCell or pSCell).

Figure 5:
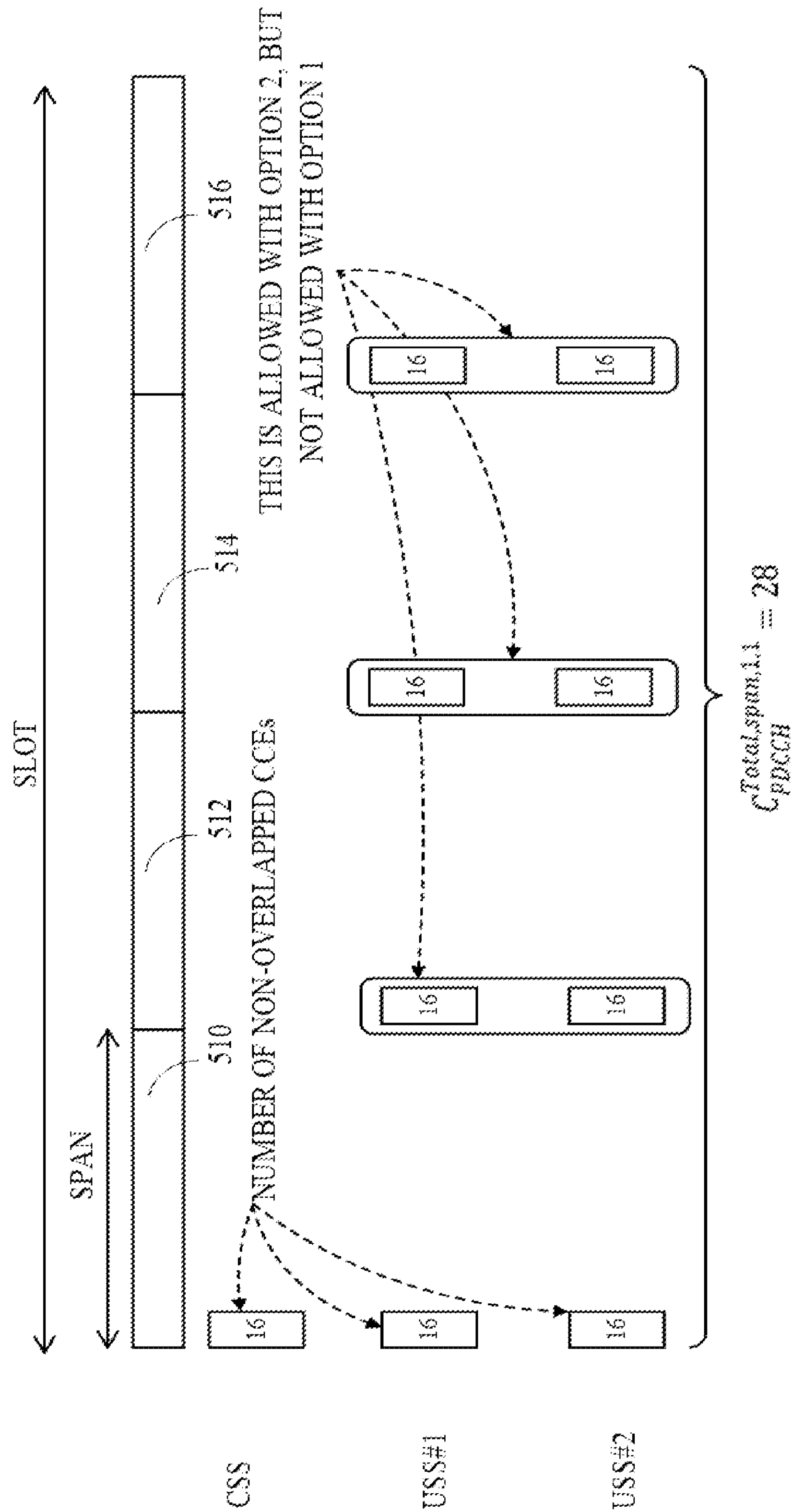
FIG. 5 illustrates a diagram of options for search space sets configuration with PDCCH overbooking in accordance with one embodiment.

FIG. 5 illustrates one example for PDCCH candidates monitoring configurations in accordance to Option 1 and Option 2, assuming 30 kHz SCS and span (4,3). In this example, a slot includes span 510, span 512, span 514, and span 516. The span 510 include a monitoring location configured for 16 non-overlapped CCEs corresponding to a CSS, as wells as 16 non-overlapped CCEs corresponding to a first USS (USS #1) and a second USS (USS #2), each. The spans 512, 514, and 516 each also include monitoring locations configured for 16 non-overlapped CCEs corresponding to the first USS and the second USS, but the CSS is not configured on these spans. As shown in FIG. 5, Option 2 provides more flexibility for gNB to schedule PDCCH transmission as it is allowed to configure addition USS #2, although it results in the PDCCH overbooking on spans 420, 430, 440 without CSS configuration, at the cost of increased complexity at UE side to perform the dropping rule on these spans.

In certain embodiments, the following procedure is used for PDCCH candidates dropping if overbooking occurs in a span i. The procedure includes denoting all search space sets with the span i, for an SCS u: by $S_{CSS}^{u,i}$ a total number of common search space (CSS) sets with cardinality of $I_{CSS}^{u,i}$; and by $S_{USS}^{u,i}$ a total number of CSS sets with cardinality of $J_{USS}^{u,i}$. The location of UE-specific search space (USS) sets $S_j^{u,i}$, $0\le j<J_{USS}^{u,i}$, in $S_{CSS}^{u,i}$ is according to an ascending order of a search space set (SSS) index q.

The procedure further includes denoting: by $$M_{S_{CSS(k)}^{u,i}}^{(L)},$$

$0\le k<I_{CSS}^{u,i}$, a number of counted PDCCH candidates for monitoring for CSS set $S_{CSS}^{u,i}(k)$; and by $$M_{S_{USS}^{u,i}(p)}^{(L)},$$

$0\le p<J_{USS}^{u,i}$, a number of counted PDCCH candidates for monitoring for USS set $S_{USS}^{u,i}(p)$.

The procedure further includes, for the CSS sets, the UE monitors $M_{PDCCH}^{CSS,u,i}=$ $$\sum_{k=0}^{I_{CSS}^{u,i}} \sum_L M_{S_{CSS}^{u,i}(k)}^{(L)}$$

PDCCH candidates using a total number of $C_{PDCCH}^{CSS,u,i}$ non-overlapping CCEs in a slot.

The procedure further includes denoting by $V_{CCE}(S_{USS}^{u,i}(p))$ the set of non-overlapped CCEs for SSS $S_{USS}^{u,i}(p)$ and by $\mathbb{C}(V_{CCE}(S_{USS}^{u,i}(p)))$ the cardinality of $V_{CCE}(S_{USS}^{u,i}(p))$ where the non-overlapping CCEs for SSS $S_{USS}^{u,i}(p)$ are determined considering the allocated PDCCH candidates for monitoring for the CSS sets and the allocated PDCCH candidates for monitoring for all SSS $S_{USS}^{u,i}(q)$, $0 \leq q \leq p$.

Figure 6:
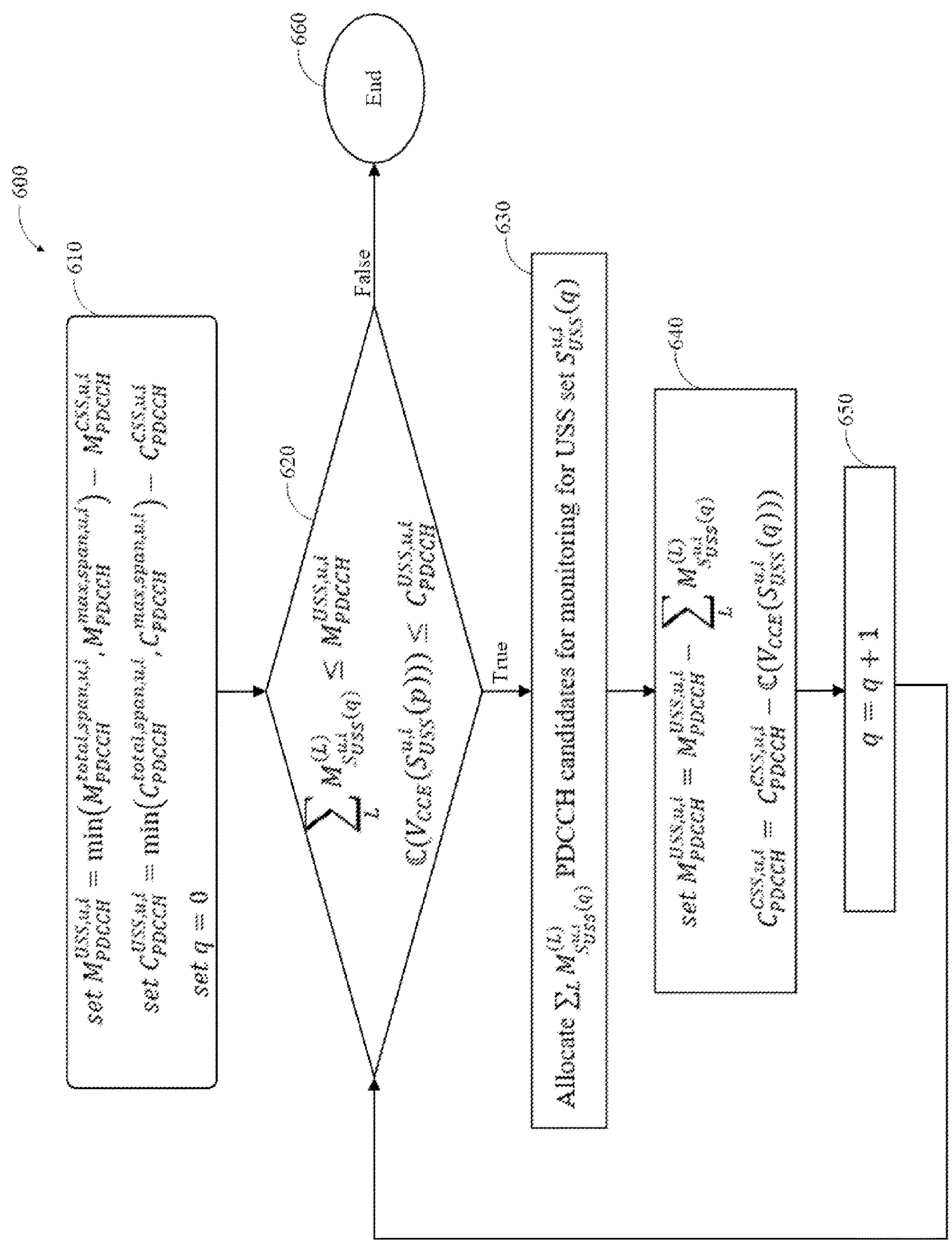
FIG. 6 illustrates a method in accordance with one embodiment.

With reference to the method 600 shown in FIG. 6, the procedure further includes a skipping operation. In block 610, the method 600 includes performing:

$$\text{set } M_{PDCCH}^{USS,u,i} = \min\left(M_{PDCCH}^{total,span,u,i}, M_{PDCCH}^{max,span,u,i}\right) - M_{PDCCH}^{CSS,u,i},$$

$$\text{set } C_{PDCCH}^{USS,u,i} = \min\left(C_{PDCCH}^{total,span,u,i}, C_{PDCCH}^{max,span,u,i}\right) - C_{PDCCH}^{CSS,u,i},$$

and $$\text{set } q = 0.$$

In block 620, the method 600 includes determining whether the following two inequalities are satisfied:

$$\sum_L M_{S_{USS}^{u,i}(q)}^{(L)} \leq M_{PDCCH}^{USS,u,i},$$

and $$\mathbb{C}\left(V_{CCE}\left(S_{USS}^{u,i}(p)\right)\right) \leq C_{PDCCH}^{USS,u,i}.$$

If the two inequalities are satisfied, the method 600 includes performing blocks 630, 640, and 650 before returning to block 620. In block 630, the method 600 allocates $$\sum_L M_{S_{USS}^{u,i}(q)}^{(L)}$$

PDCCH candidates for monitoring for USS set $S_{USS}^{u,i}(q)$. In block 640, the method 600 performs:

$$\text{set } M_{PDCCH}^{USS,u,i} = M_{PDCCH}^{USS,u,i} - \sum_L M_{S_{USS}^{u,i}(q)}^{(L)},$$

and $$C_{PDCCH}^{CSS,u,i} = C_{PDCCH}^{CSS,u,i} - \mathbb{C}\left(V_{CCE}\left(S_{USS}^{u,i}(q)\right)\right).$$

In block 650, the method increments the SSS index (q=q+1) before returning to block 620.

If, at block 620, it is determined that one or more of the inequalities is false, the method 600 ends at block 660.

In addition to Option 1 and Option 2 discussed in relation to FIG. 5, certain embodiments include a third option (Option 3) wherein overbooking is allowed for a subset of the span(s) on cell(s) containing the CSS (e.g., PCell or pSCell). In such embodiments, the eligible search spaces should include the spans where a CSS is configured. In one embodiment, the defined subset must include the spans where the CSS is configured. In one embodiment, the defined subset should be in addition to the spans where the CSS is configured. The information may be signaled as part of the search space configuration.

Figure 7:
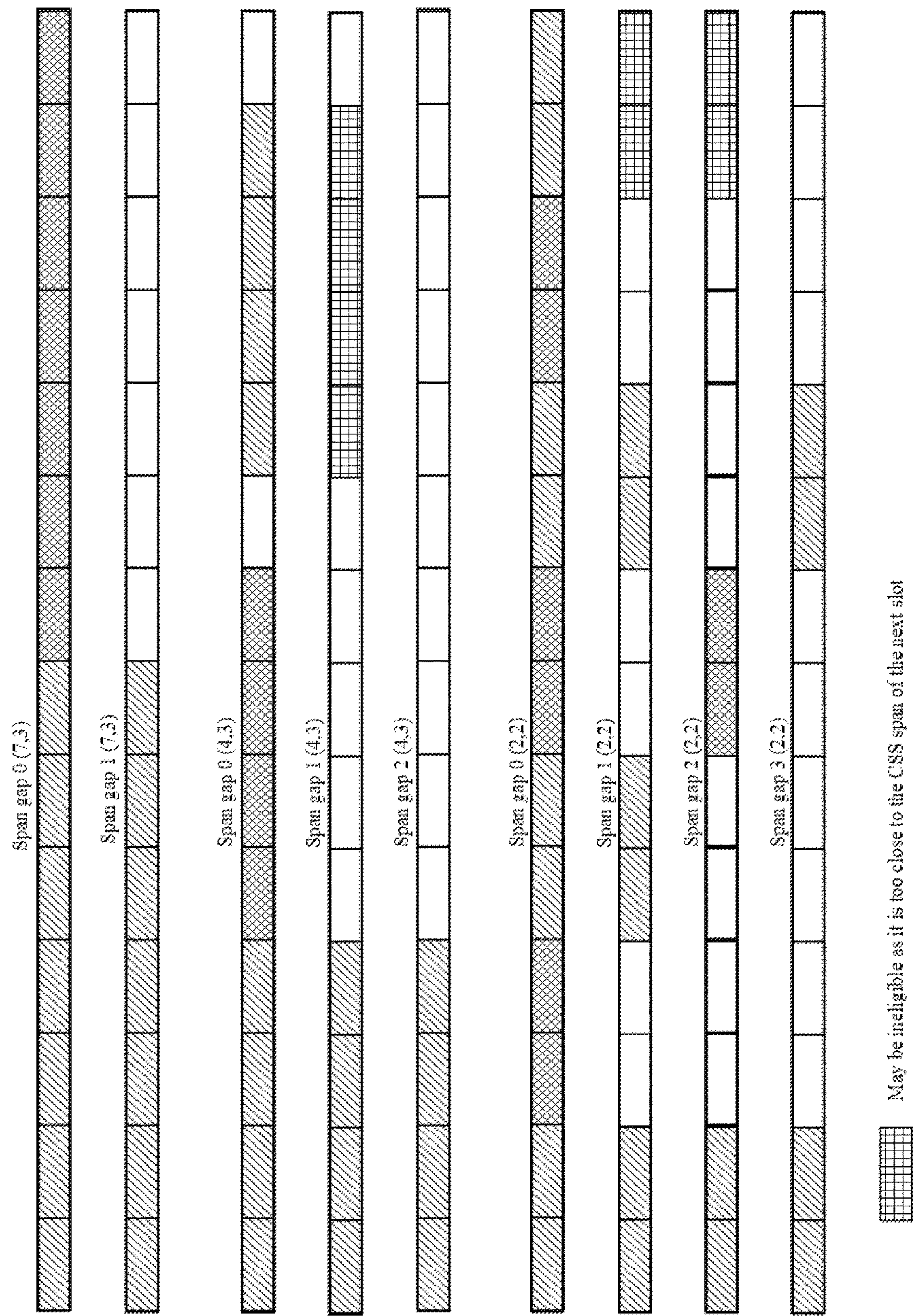
FIG. 7 illustrates an overbooking configuration in accordance with one embodiment.

FIG. 7 illustrates an overbooking configuration according to one embodiment under Option 3 wherein the gNB or UE may identify a subset of symbols that are eligible for overbooking/dropping. In this embodiment, the UE may identify a minimum span gap between over-booking/dropping procedures (e.g., signaled as a UE capability). For example, as shown in FIG. 7, for span pattern (7,3): span gap (0) includes at most 2 spans eligible (e.g., a first span within the first 7 symbols of the slot and a second span within the next 7 symbols of the slot); and span gap (1) including at most 1 span eligible, which includes the span containing CSS (e.g., within the first 7 symbols of the slot).

Similarly, for span pattern (4,3): span gap (0) includes at most 3 span eligible; span gap (1) includes at most 2 spans eligible; and span gap (2) includes at most 1 span eligible, which includes the span containing CSS.

For span pattern (2,2): span gap (0) includes at most 7 spans eligible; span gap (1) includes at most 4 spans eligible; span gap (2) includes at most 3 span eligible; span gap (3, 4, 5) each include at most 2 spans eligible; span gap (>6) includes at most 1 span eligible, which includes the span containing CSS.

As shown in FIG. 7, if a span at the end of the slot is too close to the first span in the next slot, it may be dropped.

In another embodiment under Option 3, the UE may identify a set of eligible spans to be dropped for each configuration. For example, this may be signaled as an index to a bitmap or to a set of bitmaps. Under one embodiment, the UE selects a bit sequence identifying the spans eligible for dropping. For example, for span pattern (7,3) a 2 bit sequence is used, for span pattern (4,3) a 3-bit sequence is used, and for span pattern (2,2) a 7-bit sequence is used. In another embodiment, a set of eligible sequences may be predetermined in a table and the UE signals the sequence(s) that it can support. In yet another embodiment, the UE signals a specific sequence, and any sequence that is a subset of the sequence (i.e., in which a one is converted into a zero) is eligible. Thus, any span configuration that is of lower complexity is eligible. For example, for span pattern (4,3) if sequence [1 0 1] is eligible, then [1 0 0] is also eligible.

Example System Architecture

In certain embodiments, 5G System architecture supports data connectivity and services enabling deployments to use techniques such as Network Function Virtualization and Software Defined Networking. The 5G System architecture may leverage service-based interactions between Control Plane Network Functions. Separating User Plane functions from the Control Plane functions allows independent scalability, evolution, and flexible deployments (e.g., centralized location or distributed (remote) location). Modularized function design allows for function re-use and may enable flexible and efficient network slicing. A Network Function and its Network Function Services may interact with another NF and its Network Function Services directly or indirectly via a Service Communication Proxy. Another intermediate function may help route Control Plane messages. The architecture minimizes dependencies between the AN and the CN. The architecture may include a converged core network with a common AN-CN interface that integrates different Access Types (e.g., 3GPP access and non-3GPP access). The architecture may also support a unified authentication framework, stateless NFs where the compute resource is decoupled from the storage resource, capability exposure, concurrent access to local and centralized services (to support low latency services and access to local data networks, User Plane functions can be deployed close to the AN), and/or roaming with both Home routed traffic as well as Local breakout traffic in the visited PLMN.

The 5G architecture may be defined as service-based and the interaction between network functions may include a service-based representation, where network functions (e.g., AMF) within the Control Plane enable other authorized network functions to access their services. The service-based representation may also include point-to-point reference points. A reference point representation may also be used to show the interactions between the NF services in the network functions described by point-to-point reference point (e.g., N11) between any two network functions (e.g., AMF and SMF).

Figure 8:
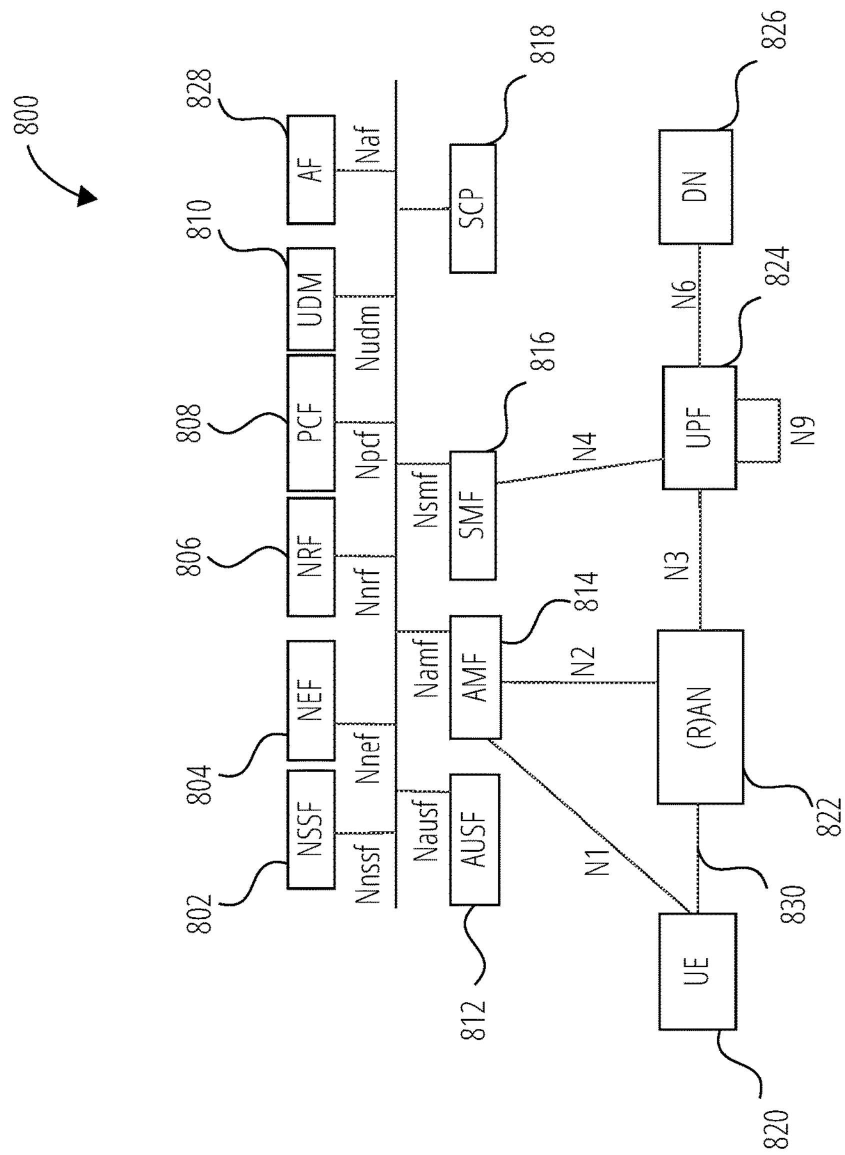
FIG. 8 illustrates an example service based architecture in accordance with certain embodiments.

FIG. 8 illustrates a service based architecture 800 in 5GS according to one embodiment. As described in 3GPP TS 23.501, the service based architecture 800 comprises NFs such as an NSSF 802, a NEF 804, an NRF 806, a PCF 808, a UDM 810, an AUSF 812, an AMF 814, an SMF 816, for communication with a UE 820, a (R)AN 822, a UPF 824, and a DN 826. The NFs and NF services can communicate directly, referred to as Direct Communication, or indirectly via a SCP 818, referred to as Indirect Communication. FIG. 8 also shows corresponding service-based interfaces including Nutm, Naf, Nudm, Npcf, Nsmf, Nnrf, Namf, Nnef, Nnssf, and Nausf, as well as reference points N1, N2, N3, N4, and N6. A few example functions provided by the NFs shown in FIG. 8 are described below.

The NSSF 802 supports functionality such as: selecting the set of Network Slice instances serving the UE; determining the Allowed NSSAI and, if needed, mapping to the Subscribed S-NSSAIs; determining the Configured NSSAI and, if needed, the mapping to the Subscribed S-NSSAIs; and/or determining the AMF Set to be used to serve the UE, or, based on configuration, a list of candidate AMF(s), possibly by querying the NRF.

The NEF 804 supports exposure of capabilities and events. NF capabilities and events may be securely exposed by the NEF 804 (e.g., for 3rd party, Application Functions, and/or Edge Computing). The NEF 804 may store/retrieve information as structured data using a standardized interface (Nudr) to a UDR. The NEF 804 may also secure provision of information from an external application to 3GPP network and may provide for the Application Functions to securely provide information to the 3GPP network (e.g., expected UE behavior, 5GLAN group information, and service specific information), wherein the NEF 804 may authenticate and authorize and assist in throttling the Application Functions. The NEF 804 may provide translation of internal-external information by translating between information exchanged with the AF and information exchanged with the internal network function. For example, the NEF 804 translates between an AF-Service-Identifier and internal 5G Core information such as DNN and S-NSSAI. The NEF 804 may handle masking of network and user sensitive information to external AF's according to the network policy. The NEF 804 may receive information from other network functions (based on exposed capabilities of other network functions), and stores the received information as structured data using a standardized interface to a UDR. The stored information can be accessed and re-exposed by the NEF 804 to other network functions and Application Functions, and used for other purposes such as analytics. For external exposure of services related to specific UE(s), the NEF 804 may reside in the HPLMN. Depending on operator agreements, the NEF 804 in the HPLMN may have interface(s) with NF(s) in the VPLMN. When a UE is capable of switching between EPC and 5GC, an SCEF+NEF may be used for service exposure.

The NRF 806 supports service discovery function by receiving an NF Discovery Request from an NF instance or SCP and providing the information of the discovered NF instances to the NF instance or SCP. The NRF 806 may also support P-CSCF discovery (specialized case of AF discovery by SMF), maintains the NF profile of available NF instances and their supported services, and/or notify about newly registered/updated/deregistered NF instances along with its NF services to the subscribed NF service consumer or SCP. In the context of Network Slicing, based on network implementation, multiple NRFs can be deployed at different levels such as a PLMN level (the NRF is configured with information for the whole PLMN), a shared-slice level (the NRF is configured with information belonging to a set of Network Slices), and/or a slice-specific level (the NRF is configured with information belonging to an S-NSSAI). In the context of roaming, multiple NRFs may be deployed in the different networks, wherein the NRF(s) in the Visited PLMN (known as the vNRF) are configured with information for the visited PLMN, and wherein the NRF(s) in the Home PLMN (known as the hNRF) are configured with information for the home PLMN, referenced by the vNRF via an N27 interface.

The PCF 808 supports a unified policy framework to govern network behavior. The PCF 808 provides policy rules to Control Plane function(s) to enforce them. The PCF 808 accesses subscription information relevant for policy decisions in a Unified Data Repository (UDR). The PCF 808 may access the UDR located in the same PLMN as the PCF.

The UDM 810 supports generation of 3GPP AKA Authentication Credentials, User Identification Handling (e.g., storage and management of SUPI for each subscriber in the 5G system), de-concealment of a privacy-protected subscription identifier (SUCI), access authorization based on subscription data (e.g., roaming restrictions), UE's Serving NF Registration Management (e.g., storing serving AMF for UE, storing serving SMF for UE's PDU Session), service/session continuity (e.g., by keeping SMF/DNN assignment of ongoing sessions. MT-SMS delivery, Lawful Intercept Functionality (especially in outbound roaming cases where a UDM is the only point of contact for LI), subscription management, SMS management, 5GLAN group management handling, and/or external parameter provisioning (Expected UE Behavior parameters or Network Configuration parameters). To provide such functionality, the UDM 810 uses subscription data (including authentication data) that may be stored in a UDR, in which case a UDM implements the application logic and may not require an internal user data storage and several different UDMs may serve the same user in different transactions. The UDM 810 may be located in the HPLMN of the subscribers it serves, and may access the information of the UDR located in the same PLMN.

The AF 828 interacts with the Core Network to provide services that, for example, support the following: application influence on traffic routing; accessing the NEF 804; interacting with the Policy framework for policy control; and/or IMS interactions with 5GC. Based on operator deployment, Application Functions considered to be trusted by the operator can be allowed to interact directly with relevant Network Functions. Application Functions not allowed by the operator to access directly the Network Functions may use the external exposure framework via the NEF 804 to interact with relevant Network Functions.

The AUSF 812 supports authentication for 3GPP access and untrusted non-3GPP access. The AUSF 812 may also provide support for Network Slice-Specific Authentication and Authorization.

The AMF 814 supports termination of RAN CP interface (N2), termination of NAS (N1) for NAS ciphering and integrity protection, registration management, connection management, reachability management, Mobility Management, lawful intercept (for AMF events and interface to LI System), transport for SM messages between UE and SMF, transparent proxy for routing SM messages, Access Authentication, Access Authorization, transport for SMS messages between UE and SMSF, SEAF, Location Services management for regulatory services, transport for Location Services messages between UE and LMF as well as between RAN and LMF, EPS Bearer ID allocation for interworking with EPS, UE mobility event notification, Control Plane CIoT 5GS Optimization, User Plane CIoT 5GS Optimization, provisioning of external parameters (Expected UE Behavior parameters or Network Configuration parameters), and/or Network Slice-Specific Authentication and Authorization. Some or all of the AMF functionalities may be supported in a single instance of the AMF 814. Regardless of the number of Network functions, in certain embodiments there is only one NAS interface instance per access network between the UE and the CN, terminated at one of the Network functions that implements at least NAS security and Mobility Management. The AMF 814 may also include policy related functionalities.

In addition to the functionalities described above, the AMF 814 may include the following functionality to support non-3GPP access networks: support of N2 interface with N3IWF/TNGF, over which some information (e.g., 3GPP Cell Identification) and procedures (e.g., Handover related) defined over 3GPP access may not apply, and non-3GPP access specific information may be applied that do not apply to 3GPP accesses; support of NAS signaling with a UE over N3IWF/TNGF, wherein some procedures supported by NAS signaling over 3GPP access may be not applicable to untrusted non-3GPP (e.g., Paging) access; support of authentication of UEs connected over N3IWF/TNGF; management of mobility, authentication, and separate security context state(s) of a UE connected via a non-3GPP access or connected via a 3GPP access and a non-3GPP access simultaneously; support a coordinated RM management context valid over a 3GPP access and a Non 3GPP access; and/or support dedicated CM management contexts for the UE for connectivity over non-3GPP access. Not all of the above functionalities may be required to be supported in an instance of a Network Slice.

The SMF 816 supports Session Management (e.g., Session Establishment, modify and release, including tunnel maintain between UPF and AN node), UE IP address allocation & management (including optional Authorization) wherein the UE IP address may be received from a UPF or from an external data network, DHCPv4 (server and client) and DHCPv6 (server and client) functions, functionality to respond to Address Resolution Protocol requests and/or IPv6 Neighbor Solicitation requests based on local cache information for the Ethernet PDUs (e.g., the SMF responds to the ARP and/or the IPV6 Neighbor Solicitation Request by providing the MAC address corresponding to the IP address sent in the request), selection and control of User Plane functions including controlling the UPF to proxy ARP or IPv6 Neighbor Discovery or to forward all ARP/IPv6 Neighbor Solicitation traffic to the SMF for Ethernet PDU Sessions, traffic steering configuration at the UPF to route traffic to proper destinations, 5G VN group management (e.g., maintain the topology of the involved PSA UPFs, establish and release the N19 tunnels between PSA UPFs, configure traffic forwarding at UPF to apply local switching, and/or N6-based forwarding or N19-based forwarding), termination of interfaces towards Policy control functions, lawful intercept (for SM events and interface to LI System), charging data collection and support of charging interfaces, control and coordination of charging data collection at the UPF, termination of SM parts of NAS messages, Downlink Data Notification, Initiator of AN specific SM information sent via AMF over N2 to AN, determination of SSC mode of a session, Control Plane CIoT 5GS Optimization, header compression, acting as I-SMF in deployments where I-SMF can be inserted/removed/relocated, provisioning of external parameters (Expected UE Behavior parameters or Network Configuration parameters), P-CSCF discovery for IMS services, roaming functionality (e.g., handle local enforcement to apply QOS SLAs (VPLMN), charging data collection and charging interface (VPLMN), and/or lawful intercept (in VPLMN for SM events and interface to LI System), interaction with external DN for transport of signaling for PDU Session authentication/authorization by external DN, and/or instructing UPF and NG-RAN to perform redundant transmission on N3/N9 interfaces. Some or all of the SMF functionalities may be supported in a single instance of a SMF. However, in certain embodiments, not all of the functionalities are required to be supported in an instance of a Network Slice. In addition to the functionalities, the SMF 816 may include policy related functionalities.

The SCP 818 includes one or more of the following functionalities: Indirect Communication; Delegated Discovery; message forwarding and routing to destination NF/NF services; communication security (e.g., authorization of the NF Service Consumer to access the NF Service Producer's API), load balancing, monitoring, overload control, etc.; and/or optionally interact with the UDR, to resolve the UDM Group ID/UDR Group ID/AUSF Group ID/PCF Group ID/CHF Group ID/HSS Group ID based on UE identity (e.g., SUPI or IMPI/IMPU). Some or all of the SCP functionalities may be supported in a single instance of an SCP. In certain embodiments, the SCP 818 may be deployed in a distributed manner and/or more than one SCP can be present in the communication path between NF Services. SCPs can be deployed at PLMN level, shared-slice level, and slice-specific level. It may be left to operator deployment to ensure that SCPs can communicate with relevant NRFs.

The UE 820 may include a device with radio communication capabilities. For example, the UE 820 may comprise a smartphone (e.g., handheld touchscreen mobile computing devices connectable to one or more cellular networks). The UE 820 may also comprise any mobile or non-mobile computing device, such as Personal Data Assistants (PDAs), pagers, laptop computers, desktop computers, wireless handsets, or any computing device including a wireless communications interface. A UE may also be referred to as a client, mobile, mobile device, mobile terminal, user terminal, mobile unit, mobile station, mobile user, subscriber, user, remote station, access agent, user agent, receiver, radio equipment, reconfigurable radio equipment, or reconfigurable mobile device. The UE 820 may comprise an IoT UE, which can comprise a network access layer designed for low-power IoT applications utilizing short-lived UE connections. An IoT UE can utilize technologies (e.g., M2M, MTC, or mMTC technology) for exchanging data with an MTC server or device via a PLMN, other UEs using ProSe or D2D communications, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure). The IoT UEs may execute background applications (e.g., keep-alive messages, status updates, etc.) to facilitate the connections of the IoT network.

The UE 820 may be configured to connect or communicatively couple with the (R)AN 822 through a radio interface 830, which may be a physical communication interface or layer configured to operate with cellular communication protocols such as a GSM protocol, a CDMA network protocol, a Push-to-Talk (PTT) protocol, a PTT over Cellular (POC) protocol, a UMTS protocol, a 3GPP LTE protocol, a 5G protocol, a NR protocol, and the like. For example, the UE 820 and the (R)AN 822 may use a Uu interface (e.g., an LTE-Uu interface) to exchange control plane data via a protocol stack comprising a PHY layer, a MAC layer, an RLC layer, a PDCP layer, and an RRC layer. A DL transmission may be from the (R)AN 822 to the UE 820 and a UL transmission may be from the UE 820 to the (R)AN 822. The UE 820 may further use a sidelink to communicate directly with another UE (not shown) for D2D, P2P, and/or ProSe communication. For example, a ProSe interface may comprise one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The (R)AN 822 can include one or more access nodes, which may be referred to as base stations (BSs), NodeBs, evolved NodeBs (eNBs), next Generation NodeBs (gNB), RAN nodes, controllers, transmission reception points (TRPs), and so forth, and can comprise ground stations (e.g., terrestrial access points) or satellite stations providing coverage within a geographic area (e.g., a cell). The (R)AN 822 may include one or more RAN nodes for providing macrocells, picocells, femtocells, or other types of cells. A macrocell may cover a relatively large geographic area (e.g., several kilometers in radius) and may allow unrestricted access by UEs with service subscription. A picocell may cover a relatively small geographic area and may allow unrestricted access by UEs with service subscription. A femtocell may cover a relatively small geographic area (e.g., a home) and may allow restricted access by UEs having an association with the femtocell (e.g., UEs in a Closed Subscriber Group (CSG), UEs for users in the home, etc.).

Although not shown, multiple RAN nodes (such as the (R)AN 822) may be used, wherein an Xn interface is defined between two or more nodes. In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for the UE 820 in a connected mode (e.g., CM-CONNECTED) including functionality to manage the UE mobility for connected mode between one or more (R)AN nodes. The mobility support may include context transfer from an old (source) serving (R)AN node to new (target) serving (R)AN node; and control of user plane tunnels between old (source) serving (R)AN node to new (target) serving (R)AN node.

The UPF 824 may act as an anchor point for intra-RAT and inter-RAT mobility, an external PDU session point of interconnect to the DN 826, and a branching point to support multi-homed PDU session. The UPF 824 may also perform packet routing and forwarding, packet inspection, enforce user plane part of policy rules, lawfully intercept packets (UP collection); traffic usage reporting, perform QoS handling for user plane (e.g. packet filtering, gating, UL/DL rate enforcement), perform Uplink Traffic verification (e.g., SDF to QoS flow mapping), transport level packet marking in the uplink and downlink, and downlink packet buffering and downlink data notification triggering. The UPF 824 may include an uplink classifier to support routing traffic flows to a data network. The DN 826 may represent various network operator services, Internet access, or third party services. The DN 826 may include, for example, an application server.

Figure 9:
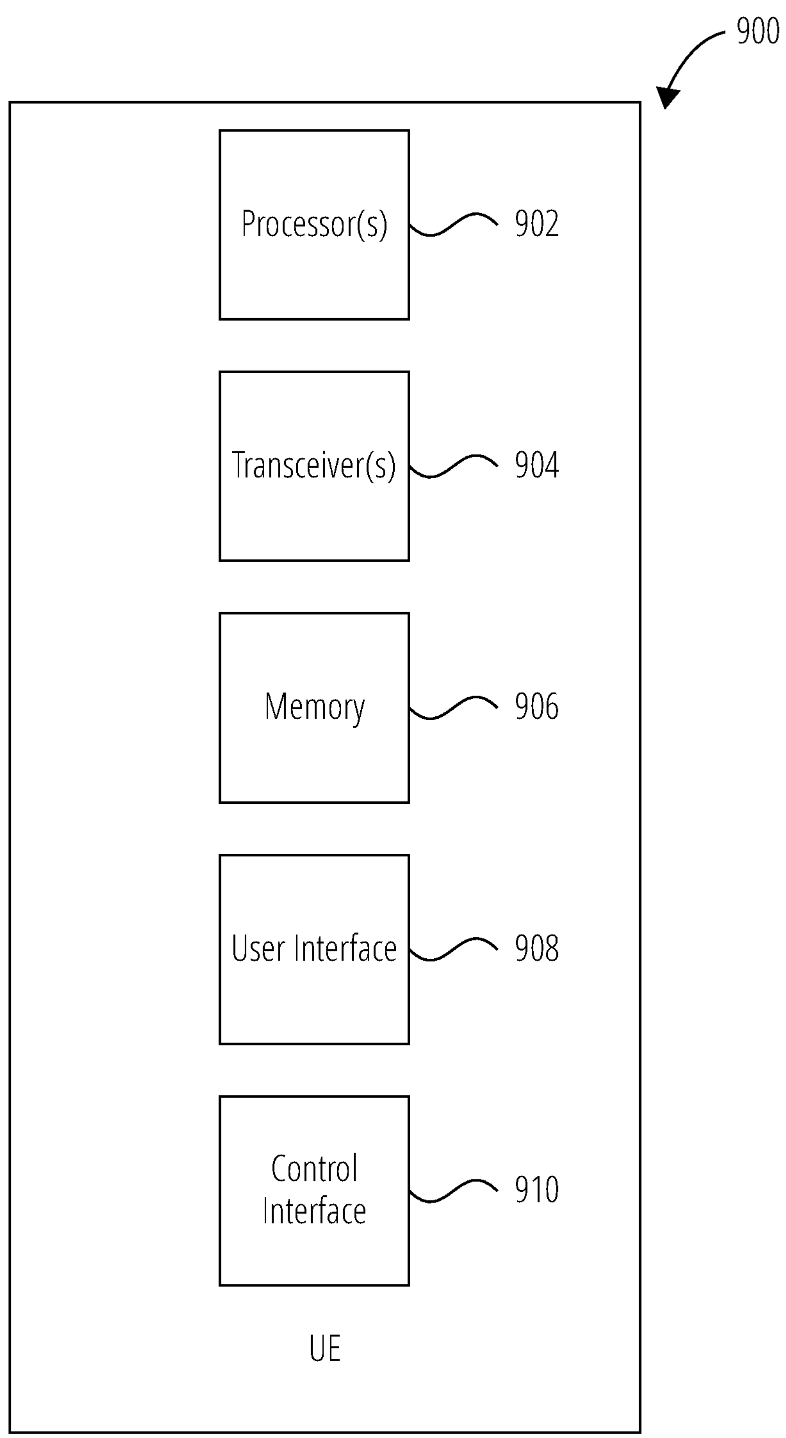
FIG. 9 illustrates a UE in accordance with one embodiment.

FIG. 9 is a block diagram of an example UE 900 configurable according to various embodiments of the present disclosure, including by execution of instructions on a computer-readable medium that correspond to any of the example methods and/or procedures described herein. The UE 900 comprises one or more processor 902, transceiver 904, memory 906, user interface 908, and control interface 910.

The one or more processor 902 may include, for example, an application processor, an audio digital signal processor, a central processing unit, and/or one or more baseband processors. Each of the one or more processor 902 may include internal memory and/or may include interface(s) to communication with external memory (including the memory 906). The internal or external memory can store software code, programs, and/or instructions for execution by the one or more processor 902 to configure and/or facilitate the UE 900 to perform various operations, including operations described herein. For example, execution of the instructions can configure the UE 900 to communicate using one or more wired or wireless communication protocols, including one or more wireless communication protocols standardized by 3GPP such as those commonly known as 5G/NR, LTE, LTE-A, UMTS, HSPA, GSM, GPRS, EDGE, etc., or any other current or future protocols that can be utilized in conjunction with the one or more transceiver 904, user interface 908, and/or control interface 910. As another example, the one or more processor 902 may execute program code stored in the memory 906 or other memory that corresponds to MAC, RLC, PDCP, and RRC layer protocols standardized by 3GPP (e.g., for NR and/or LTE). As a further example, the processor 902 may execute program code stored in the memory 906 or other memory that, together with the one or more transceiver 904, implements corresponding PHY layer protocols, such as Orthogonal Frequency Division Multiplexing (OFDM), Orthogonal Frequency Division Multiple Access (OFDMA), and Single-Carrier Frequency Division Multiple Access (SC-FDMA).

The memory 906 may comprise memory area for the one or more processor 902 to store variables used in protocols, configuration, control, and other functions of the UE 900, including operations corresponding to, or comprising, any of the example methods and/or procedures described herein. Moreover, the memory 906 may comprise non-volatile memory (e.g., flash memory), volatile memory (e.g., static or dynamic RAM), or a combination thereof. Furthermore, the memory 906 may interface with a memory slot by which removable memory cards in one or more formats (e.g., SD Card, Memory Stick, Compact Flash, etc.) can be inserted and removed.

The one or more transceiver 904 may include radio-frequency transmitter and/or receiver circuitry that facilitates the UE 900 to communicate with other equipment supporting like wireless communication standards and/or protocols. For example, the one or more transceiver 904 may include switches, mixer circuitry, amplifier circuitry, filter circuitry, and synthesizer circuitry. Such RF circuitry may include a receive signal path with circuitry to down-convert RF signals received from a front-end module (FEM) and provide baseband signals to a baseband processor of the one or more processor 902. The RF circuitry may also include a transmit signal path which may include circuitry to up-convert baseband signals provided by a baseband processor and provide RF output signals to the FEM for transmission. The FEM may include a receive signal path that may include circuitry configured to operate on RF signals received from one or more antennas, amplify the received signals and provide the amplified versions of the received signals to the RF circuitry for further processing. The FEM may also include a transmit signal path that may include circuitry configured to amplify signals for transmission provided by the RF circuitry for transmission by one or more antennas. In various embodiments, the amplification through the transmit or receive signal paths may be done solely in the RF circuitry, solely in the FEM, or in both the RF circuitry and the FEM circuitry. In some embodiments, the FEM circuitry may include a TX/RX switch to switch between transmit mode and receive mode operation.

In some exemplary embodiments, the one or more transceiver 904 includes a transmitter and a receiver that enable device 1200 to communicate with various 5G/NR networks according to various protocols and/or methods proposed for standardization by 3 GPP and/or other standards bodies. For example, such functionality can operate cooperatively with the one or more processor 902 to implement a PHY layer based on OFDM, OFDMA, and/or SC-FDMA technologies, such as described herein with respect to other figures.

The user interface 908 may take various forms depending on particular embodiments, or can be absent from the UE 900. In some embodiments, the user interface 908 includes a microphone, a loudspeaker, slidable buttons, depressible buttons, a display, a touchscreen display, a mechanical or virtual keypad, a mechanical or virtual keyboard, and/or any other user-interface features commonly found on mobile phones. In other embodiments, the UE 900 may comprise a tablet computing device including a larger touchscreen display. In such embodiments, one or more of the mechanical features of the user interface 908 may be replaced by comparable or functionally equivalent virtual user interface features (e.g., virtual keypad, virtual buttons, etc.) implemented using the touchscreen display, as familiar to persons of ordinary skill in the art. In other embodiments, the UE 900 may be a digital computing device, such as a laptop computer, desktop computer, workstation, etc. that comprises a mechanical keyboard that can be integrated, detached, or detachable depending on the particular exemplary embodiment. Such a digital computing device can also comprise a touch screen display. Many example embodiments of the UE 900 having a touch screen display are capable of receiving user inputs, such as inputs related to exemplary methods and/or procedures described herein or otherwise known to persons of ordinary skill in the art.

In some exemplary embodiments of the present disclosure, the UE 900 may include an orientation sensor, which can be used in various ways by features and functions of the UE 900. For example, the UE 900 can use outputs of the orientation sensor to determine when a user has changed the physical orientation of the UE 900's touch screen display. An indication signal from the orientation sensor can be available to any application program executing on the UE 900, such that an application program can change the orientation of a screen display (e.g., from portrait to landscape) automatically when the indication signal indicates an approximate 90-degree change in physical orientation of the device. In this manner, the application program can maintain the screen display in a manner that is readable by the user, regardless of the physical orientation of the device. In addition, the output of the orientation sensor can be used in conjunction with various exemplary embodiments of the present disclosure.

The control interface 910 may take various forms depending on particular embodiments. For example, the control interface 910 may include an RS-232 interface, an RS-485 interface, a USB interface, an HDMI interface, a Bluetooth interface, an IEEE ("Firewire") interface, an $I^2C$ interface, a PCMCIA interface, or the like. In some exemplary embodiments of the present disclosure, control interface 1260 can comprise an IEEE 802.3 Ethernet interface such as described above. In some embodiments of the present disclosure, the control interface 910 may include analog interface circuitry including, for example, one or more digital-to-analog (D/A) and/or analog-to-digital (A/D) converters.

Persons of ordinary skill in the art can recognize the above list of features, interfaces, and radio-frequency communication standards is merely exemplary, and not limiting to the scope of the present disclosure. In other words, the UE 900 may include more functionality than is shown in FIG. 9 including, for example, a video and/or still-image camera, microphone, media player and/or recorder, etc. Moreover, the one or more transceiver 904 may include circuitry for communication using additional radio-frequency communication standards including Bluetooth, GPS, and/or others. Moreover, the one or more processor 902 may execute software code stored in the memory 906 to control such additional functionality. For example, directional velocity and/or position estimates output from a GPS receiver can be available to any application program executing on the UE 900, including various exemplary methods and/or computer-readable media according to various exemplary embodiments of the present disclosure.

Figure 10:
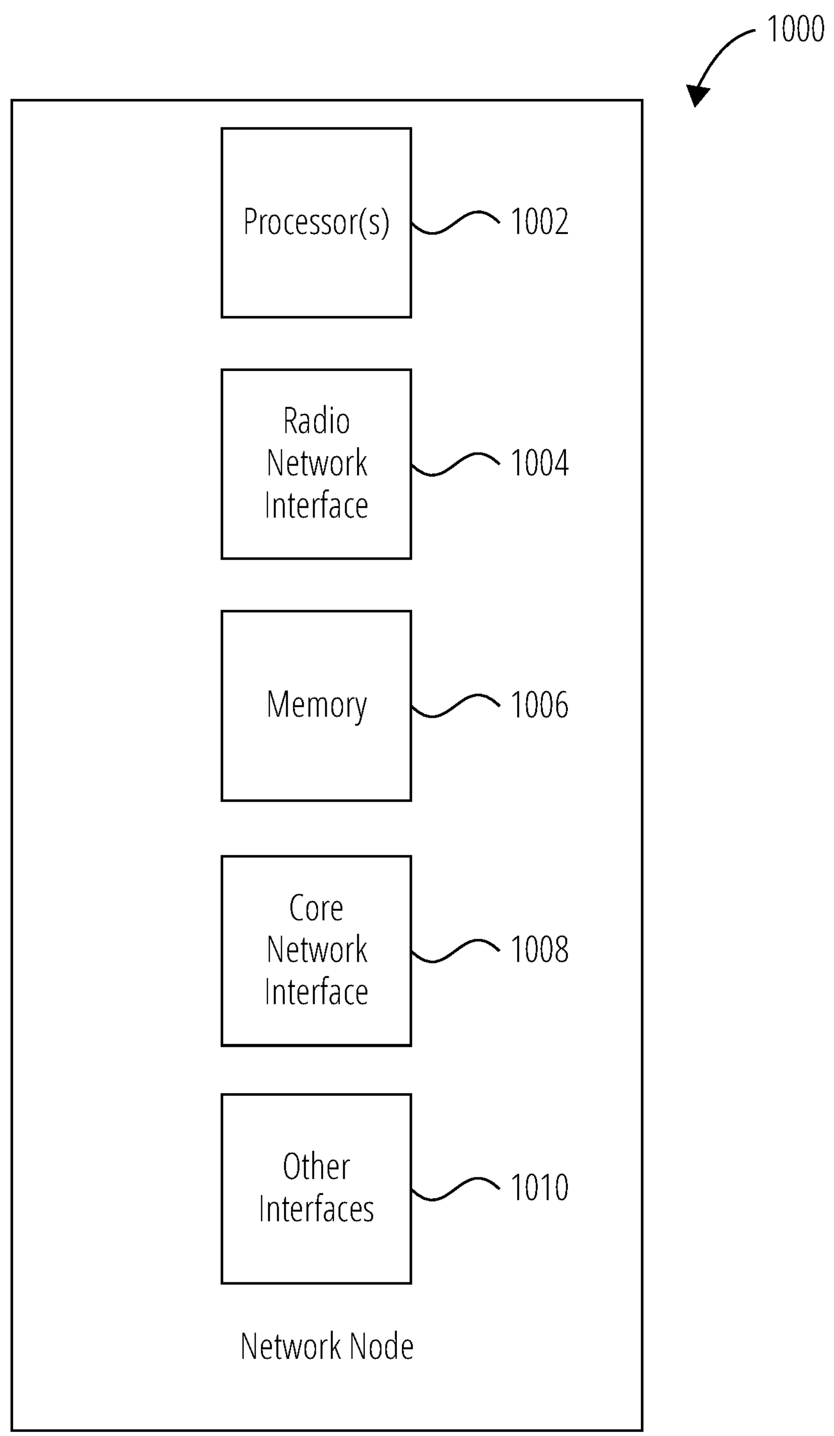
FIG. 10 illustrates a network node in accordance with one embodiment.

FIG. 10 is a block diagram of an example network node 1000 configurable according to various embodiments of the present disclosure, including by execution of instructions on a computer-readable medium that correspond to any of the example methods and/or procedures described herein.

The network node 1000 includes a one or more processor 1002, a radio network interface 1004, a memory 1006, a core network interface 1008, and other interfaces 1010. The network node 1000 may comprise, for example, a base station, eNB, gNB, access node, or component thereof.

The one or more processor 1002 may include any type of processor or processing circuitry and may be configured to perform an of the methods or procedures disclosed herein. The memory 1006 may store software code, programs, and/or instructions executed by the one or more processor 1002 to configure the network node 1000 to perform various operations, including operations described herein. For example, execution of such stored instructions can configure the network node 1000 to communicate with one or more other devices using protocols according to various embodiments of the present disclosure, including one or more methods and/or procedures discussed above. Furthermore, execution of such stored instructions can also configure and/or facilitate the network node 1000 to communicate with one or more other devices using other protocols or protocol layers, such as one or more of the PHY, MAC, RLC, PDCP, and RRC layer protocols standardized by 3GPP for LTE, LTE-A, and/or NR, or any other higher-layer protocols utilized in conjunction with the radio network interface 1004 and the core network interface 1008. By way of example and without limitation, the core network interface 1008 comprise an S1 interface and the radio network interface 1004 may comprise a Uu interface, as standardized by 3GPP. The memory 1006 may also store variables used in protocols, configuration, control, and other functions of the network node 1000. As such, the memory 1006 may comprise non-volatile memory (e.g., flash memory, hard disk, etc.), volatile memory (e.g., static or dynamic RAM), network-based (e.g., "cloud") storage, or a combination thereof.

The radio network interface 1004 may include transmitters, receivers, signal processors, ASICs, antennas, beamforming units, and other circuitry that enables network node 1000 to communicate with other equipment such as, in some embodiments, a plurality of compatible user equipment (UE). In some embodiments, the network node 1000 may include various protocols or protocol layers, such as the PHY, MAC, RLC, PDCP, and RRC layer protocols standardized by 3GPP for LTE, LTE-A, and/or 5G/NR. According to further embodiments of the present disclosure, the radio network interface 1004 may include a PHY layer based on OFDM, OFDMA, and/or SC-FDMA technologies. In some embodiments, the functionality of such a PHY layer can be provided cooperatively by the radio network interface 1004 and the one or more processor 1002.

The core network interface 1008 may include transmitters, receivers, and other circuitry that enables the network node 1000 to communicate with other equipment in a core network such as, in some embodiments, circuit-switched (CS) and/or packet-switched Core (PS) networks. In some embodiments, the core network interface 1008 may include the S1 interface standardized by 3GPP. In some embodiments, the core network interface 1008 may include one or more interfaces to one or more SGWs, MMEs, SGSNs, GGSNs, and other physical devices that comprise functionality found in GERAN, UTRAN, E-UTRAN, and CDMA2000 core networks that are known to persons of ordinary skill in the art. In some embodiments, these one or more interfaces may be multiplexed together on a single physical interface. In some embodiments, lower layers of the core network interface 1008 may include one or more of asynchronous transfer mode (ATM), Internet Protocol (IP)-over-Ethernet, SDH over optical fiber, T1/E1/PDH over a copper wire, microwave radio, or other wired or wireless transmission technologies known to those of ordinary skill in the art.

The other interfaces 1010 may include transmitters, receivers, and other circuitry that enables the network node 1000 to communicate with external networks, computers, databases, and the like for purposes of operations, administration, and maintenance of the network node 1000 or other network equipment operably connected thereto.

For one or more embodiments, at least one of the components set forth in one or more of the preceding figures may be configured to perform one or more operations, techniques, processes, and/or methods as set forth in the Example Section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

Example Section

The following examples pertain to further embodiments.

Example 1 may include a method, apparatus, or means to perform one or more elements of an embodiment described herein.

Example 2 may include one or more non-transitory computer-readable media comprising instructions to cause an electronic device, upon execution of the instructions by one or more processors of the electronic device, to perform one or more elements of a method described in or related to any of the above Examples, or any other method or process described herein.

Example 3 may include an apparatus comprising logic, modules, or circuitry to perform one or more elements of a method described in or related to any of the above Examples, or any other method or process described herein.

Example 4 may include a method, technique, or process as described in or related to any of the above Examples, or portions or parts thereof.

Example 5 may include an apparatus comprising: one or more processors and one or more computer-readable media comprising instructions that, when executed by the one or more processors, cause the one or more processors to perform the method, techniques, or process as described in or related to any of the above Examples, or portions thereof.

Example 6 may include a signal as described in or related to any of the above Examples, or portions or parts thereof.

Example 7 may include a datagram, packet, frame, segment, protocol data unit (PDU), or message as described in or related to any of the above Examples, or portions or parts thereof, or otherwise described in the present disclosure.

Example 8 may include a signal encoded with data as described in or related to any of the above Examples, or portions or parts thereof, or otherwise described in the present disclosure.

Example 9 may include a signal encoded with a datagram, packet, frame, segment, PDU, or message as described in or related to any of the above Examples, or portions or parts thereof, or otherwise described in the present disclosure.

Example 10 may include an electromagnetic signal carrying computer-readable instructions, wherein execution of the computer-readable instructions by one or more processors is to cause the one or more processors to perform the method, techniques, or process as described in or related to any of the above Examples, or portions thereof.

Example 11 may include a computer program comprising instructions, wherein execution of the program by a processing element is to cause the processing element to carry out the method, techniques, or process as described in or related to any of the above Examples, or portions thereof.

Example 12 may include a signal in a wireless network as shown and described herein.

Example 13 may include a method of communicating in a wireless network as shown and described herein.

Example 14 may include a system for providing wireless communication as shown and described herein.

Example 15 may include a device for providing wireless communication as shown and described herein.

Any of the above described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

It should be recognized that the systems described herein include descriptions of specific embodiments. These embodiments can be combined into single systems, partially combined into other systems, split into multiple systems or divided or combined in other ways. In addition, it is contemplated that parameters, attributes, aspects, etc. of one embodiment can be used in another embodiment. The parameters, attributes, aspects, etc. are merely described in one or more embodiments for clarity, and it is recognized that the parameters, attributes, aspects, etc. can be combined with or substituted for parameters, attributes, aspects, etc. of another embodiment unless specifically disclaimed herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

The invention claimed is:

1. A method for a user equipment (UE) to monitor a physical downlink control channel (PDCCH) for carrier aggregation (CA), the method comprising:

receiving PDCCH candidates from a plurality of configured downlink (DL) cells;

in response to a determination that a maximum number of DL cells that the UE is capable of monitoring for PDCCH is smaller than a number of the plurality of configured DL cells, grouping the plurality of configured DL cells into groups based at least in part on subcarrier spacing (SCS) and PDCCH monitoring configurations corresponding to span patterns within a slot of a DL subframe;

determining a maximum number of blind decoding (BD) operations and non-overlapped control channel elements (CCEs) for each of the groups; and monitoring at least a first portion of the PDCCH candidates based on the maximum number of BD operations and non-overlapped CCEs for each of the groups.

2. The method of claim 1, further comprising skipping a second portion of the PDCCH candidates based on an overbooking configuration and a dropping rule.

3. The method of claim 2, wherein the overbooking configuration is only on spans where a common search space (CSS) is configured.

4. The method of claim 2, wherein the overbooking configuration is allowed for all spans where a common search space (CSS) is configured.

5. The method of claim 2, wherein skipping the second portion of the PDCCH candidates based on the overbooking configuration and the dropping rule comprises, for overbooking occurring in a span i:

denoting all search space sets with span i, for an SCS u:

by $S_{CSS}^{u,i}$ a total number of common search space (CSS) sets with cardinality of $I_{CSS}^{u,i}$; and by $S_{CSS}^{u,i}$ a total number of CSS sets with cardinality of $J_{CSS}^{u,i}$, wherein a location of UE-specific search space (USS) sets $S_j^{u,i}$, $0 \leq j < J_{CSS}^{u,i}$, in $S_{CSS}^{u,i}$ is according to an ascending order of a search space set (SSS) index q;

denoting:

by $$M^{(L)}_{S^{u,i}_{CSS}(k)},$$

$0 \leq k < I_{CSS}^{u,i}$, a number of counted PDCCH candidates for monitoring for CSS set $S_{CSS}^{u,i}$ k; and by $$M^{(L)}_{S^{u,i}_{USS}(p)},$$

$0 \leq p < J_{CSS}^{u,i}$, a number of compound PDCCH candidates for monitoring for USS set $S_{CSS}^{u,i}(p)$;

for the CSS sets, the UE monitors $$M_{PDCCH}^{CSS,ui} = \Sigma_{k=0}^{I_{CSS}^{u,i}} \Sigma_L M^{(L)}_{S^{u,i}_{CSS}(k)}$$

PDCCH candidates using a total number of $C_{PDDCH}^{CSS,u,i}$ PDCCH non-overlapping CCEs in a slot; and denoting by $V_{CCE}(S_{USS}^{u,i}(p))$ the set of non-overlapped CCEs for SSS $S_{USS}^{u,i}(p)$ and by $C(V_{CCE}(S_{USS}^{u,i}(p)))$ a cardinality of $V_{CCE}(S_{USS}^{u,i}(p))$ where the non-overlapping CCEs for by SSS $S_{USS}^{u,i}(p)$ are determined considering the allocated PDCCH candidates for monitoring for the CSS sets and the allocated PDCCH candidates for monitoring for all SSS $S_{USS}^{u,i}(q)$, $0 \leq q \leq p$.

6. The method of claim 5, further comprising executing a skipping operation comprising:

performing:

$$\text{set } M_{PDCCH}^{USS,u,i} = \min\left(M_{PDCCH}^{total,span,u,i}, M_{PDCCH}^{max,span,u,i}\right) - M_{PDCCH}^{CSS,u,i},$$

$$\text{set } C_{PDCCH}^{USS,u,i} = \min\left(C_{PDCCH}^{total,span,u,i}, C_{PDCCH}^{max,span,u,i}\right) - C_{PDCCH}^{CSS,u,i},$$

and $$\text{set } q = 0;$$

determining whether two inequalities are satisfied, the two inequalities comprising:

$$\sum_L M^{(L)}_{S^{u,i}_{USS}(q)} \le M^{USS,u,i}_{PDCCH},$$

and $$\mathbb{C}\left(V_{CCE}\left(S^{u,i}_{USS}(p)\right)\right) \le C^{USS,u,i}_{PDCCH};$$

if the two inequalities are satisfied, performing: allocate $$\Sigma_L M^{(L)}_{S^{u,i}_{USS}(q)}$$

PDCCH candidates for monitoring for USS set $S_{USS}^{u,i}(q)$, $$\text{set } M^{USS,u,i}_{PDCCH} = M^{USS,u,i}_{PDCCH} - \sum_L M^{(L)}_{S^{u,i}_{USS}(q)},$$

$$C^{CSS,u,i}_{PDCCH} = C^{CSS,u,i}_{PDCCH} - \mathbb{C}\left(V_{CCE}\left(S^{u,i}_{USS}(q)\right)\right),$$

and $$q = q + 1$$

until the two inequalities are no longer satisfied; and if the two inequalities are not satisfied, ending the skipping operation.

7. The method of claim 2, wherein the overbooking configuration is allowed for a subset of spans on one or more cells comprising a common search space (CSS).

8. The method of claim 7, wherein the subset of spans includes the spans where the CSS is configured.

9. The method of claim 7, wherein the subset of spans is in addition to the spans where the CSS is configured.

10. The method of claim 7, wherein an indication of the subset of spans is signaled as part of a search space configuration.

11. The method of claim 2, further comprising generating a UE capability message for a base station, the UE capability message including an identification of a minimum span gap between overbooking or dropping procedures, wherein the minimum span gap is selected based on the span patterns.

12. The method of claim 2, further comprising generating a UE capability message for a base station, the UE capability message including an identification of a set of eligible spans to drop for each overbooking configuration.

13. The method of claim 12, wherein the UE selects a bit sequence identifying the set of eligible spans to drop according to the span patterns.

14. The method of claim 12, wherein the set of eligible spans to drop are preconfigured in a table, and wherein the identification comprises an index to bitmap in the table.

15. The method of claim 12, wherein the identification comprises a specific sequence, and wherein any sequence that is a subset of the sequence is within the set of eligible spans to drop.

16. A non-transitory computer-readable storage medium, the non-transitory computer-readable storage medium including instructions that, when executed by a processor of a wireless communication network configured to manage user equipment (UE) upgrade requests, cause the processor to:

determine a number of cells configured to the UE for carrier aggregation (CA), the number of cells subject to a UE capability;

determine a maximum number of downlink (DL) cells that the UE is capable of monitoring for physical downlink control channel (PDCCH);

in response to a determination that the maximum number of DL cells that the UE is capable of monitoring for PDCCH is smaller than the number of cells configured to the UE for CA, group a plurality of configured DL cells into groups based at least in part on subcarrier spacing (SCS) and PDCCH monitoring configurations corresponding to span patterns within a slot of a DL subframe;

determine a maximum number of blind decoding (BD) operations and non-overlapped control channel elements (CCEs) for each of the groups; and configure the PDCCH according to the maximum number of BD operations and non-overlapped CCEs for each of the groups.

17. The non-transitory computer-readable storage medium of claim 16, wherein the instructions, when executed by the processor of the wireless communication network, further cause the processor to process a UE capability message from the UE including an indication of the maximum number of DL cells, $N_{cells}^{cap\text{-}r16}$.

18. The non-transitory computer-readable storage medium of claim 17, wherein to determine the maximum number of BD operations and non-overlapping CCEs comprises to calculate:

$$M^{total,span,u,i}_{PDCCH} = \left\lfloor N^{cap-r16}_{cells} \cdot M^{max,span,u,i}_{PDCCH} \cdot N^{DL,u,i}_{cells} / \sum_{j=0}^{1} \sum_{k=0}^{2} N^{DL,j,k}_{cells} \right\rfloor;$$

and $$C^{total,span,u,i}_{PDCCH} = \left\lfloor N^{cap-r16}_{cells} \cdot C^{max,span,u,i}_{PDCCH} \cdot N^{DL,u,i}_{cells} / \sum_{j=0}^{1} \sum_{k=0}^{2} N^{DL,j,k}_{cells} \right\rfloor,$$

wherein the UE is configured with $N_{cells}^{DL,u,i}$ cells DL cells with active DL bandwidth parts (BWPs) comprising SCS configuration u and span configuration i, cells $\Sigma_{u=0}^{1}\Sigma_{i=0}^{2}N_{cells}^{DL,u,i}>N_{cells}^{cap\text{-}r16}$, wherein $M_{PDCCH}^{max,span,u,i}$ is a maximum number of blind decoding operations for the SCS configuration u and the span configuration i, and wherein $C_{PDCCH}^{max,span,u,i}$ PDCCH is a maximum number of non-overlapped CCEs for the SCS configuration u and the span configuration i.

19. The non-transitory computer-readable storage medium of claim 18, wherein the UE is not required to monitor more than $M_{PDCCH}^{total,span,u,i}$ PDCCH candidates per span on the active DL BWPs of scheduling cells from $N_{cells}^{DL,u,i}$ DL cells.

20. The non-transitory computer-readable storage medium of claim 18, wherein the UE is not required to monitor more than the lesser of $C_{PDCCH}^{max,span,u,i}$ or $C_{PDCCH}^{total,span,u,i}$ non-overlapped CCEs per span on the active D21L BWPs of scheduling cells from $N_{cells}^{DL,u,i}$ DL cells.

* * * * *